(12) United States Patent
Freimuth

(10) Patent No.: US 12,481,264 B2
(45) Date of Patent: Nov. 25, 2025

(54) APPARATUSES AND METHODS FOR OPERATING AT LEAST TWO TOOLS

(71) Applicant: Muehlbauer GmbH & Co. KG, Roding (DE)

(72) Inventor: Marcel Freimuth, Drachselried (DE)

(73) Assignee: Muehlbauer GmbH & Co. KG, Roding (DE)

( * ) Notice: Subject to any disclaimer, the term of this patent is extended or adjusted under 35 U.S.C. 154(b) by 405 days.

(21) Appl. No.: 18/043,493

(22) PCT Filed: Aug. 24, 2021

(86) PCT No.: PCT/EP2021/073376
§ 371 (c)(1),
(2) Date: Feb. 28, 2023

(87) PCT Pub. No.: WO2022/048950
PCT Pub. Date: Mar. 10, 2022

(65) Prior Publication Data
US 2024/0027986 A1    Jan. 25, 2024

(30) Foreign Application Priority Data
Sep. 7, 2020  (DE) .................. 10 2020 005 484.6

(51) Int. Cl.
*G05B 19/402* (2006.01)
*G05B 19/418* (2006.01)

(52) U.S. Cl.
CPC ....... *G05B 19/402* (2013.01); *G05B 19/4187* (2013.01); *G05B 19/4189* (2013.01)

(58) Field of Classification Search
CPC .............. G05B 19/402; G05B 19/4187; G05B 19/4189; G05B 2219/31381;
(Continued)

(56) References Cited

U.S. PATENT DOCUMENTS

| 4,667,402 A | 5/1987 | Wilde |
| 4,990,051 A | 2/1991 | Safabakhsh et al. |

(Continued)

FOREIGN PATENT DOCUMENTS

| DE | 19822512 A1 | 10/1999 |
| DE | 10349847 B3 | 5/2005 |

(Continued)

*Primary Examiner* — Kidest Worku
(74) *Attorney, Agent, or Firm* — John A. Miller; Shumaker, Loop & Kendrick, LLP

(57) ABSTRACT

Apparatuses and methods for operating at least two tools in a first and at least a second processing area, wherein in each processing area a number of machining locations is assigned to the tool by which first components carried by a component web are conveyed along a track through the first and the at least second processing area, wherein the total number of tools in the apparatus is less than the number of machining locations in each processing area, wherein the track comprises a number of partial paths corresponding to the number of machining locations, wherein the tool of each processing area is adapted such as to couple respective second components to respective first components at each associated machining location in its processing area, and wherein the apparatus comprises a control unit adapted to operate in response to a conveying movement of the component web along the track.

20 Claims, 12 Drawing Sheets

(58) Field of Classification Search
CPC ........... G05B 2219/31383; G05B 2219/32079;
G05B 2219/32304; G05B 2219/32418;
G05B 2219/45029; G05B 19/41805;
Y02P 90/02
See application file for complete search history.

(56) References Cited

U.S. PATENT DOCUMENTS

| | | |
|---|---|---|
| 6,201,306 B1 | 3/2001 | Kurosawa et al. |
| 2002/0019174 A1 | 2/2002 | Crane, Jr. et al. |
| 2006/0013680 A1 | 1/2006 | Haba et al. |
| 2006/0237142 A1 | 10/2006 | Park et al. |
| 2007/0293002 A1 | 12/2007 | Disney |
| 2007/0293022 A1 | 12/2007 | Ko et al. |
| 2008/0086874 A1 | 4/2008 | Cheung et al. |
| 2008/0267745 A1* | 10/2008 | Schiller ............... H01L 21/681 414/806 |
| 2009/0228140 A1* | 9/2009 | Honegger ............ B65B 51/306 700/230 |
| 2009/0242124 A1 | 10/2009 | Konno et al. |
| 2010/0249971 A1* | 9/2010 | Maenishi ............. H05K 13/085 700/102 |
| 2016/0308269 A1 | 10/2016 | Marinov |

FOREIGN PATENT DOCUMENTS

| | | | |
|---|---|---|---|
| DE | 102009042651 A1 | 3/2011 | |
| DE | 102009042651 B4 * | 1/2012 | ............. H05K 13/02 |
| DE | 102011017218 A1 | 10/2012 | |
| DE | 102011104225 B4 | 12/2012 | |
| DE | 102014223032 A1 | 5/2016 | |
| EP | 0140126 A1 | 5/1985 | |
| EP | 0565781 B1 | 10/1993 | |
| EP | 949662 A2 | 10/1999 | |
| EP | 02764826 A1 | 4/2004 | |
| EP | 1764826 A1 | 3/2007 | |
| EP | 2491583 B1 | 11/2017 | |
| JP | 53100765 A | 2/1980 | |
| JP | 55070041 A | 5/1980 | |
| JP | 60097634 A | 11/1986 | |
| JP | 5267451 A | 10/1993 | |
| JP | 01109737 A | 4/2001 | |
| JP | 2002050670 A | 2/2002 | |
| JP | 2003109979 A | 4/2003 | |
| JP | 2008004936 A | 1/2008 | |
| JP | 09162204 A | 7/2009 | |
| JP | 2009238881 A | 10/2009 | |
| JP | 2010016155 A | 1/2010 | |
| JP | 2011171536 A | 9/2011 | |
| TW | 201819101 A | 6/2018 | |
| WO | 2000014789 A1 | 3/2000 | |
| WO | 2007137888 A1 | 12/2007 | |
| WO | 2009093446 A1 | 7/2009 | |
| WO | WO2013108366 A1 * | 7/2013 | ............. H05K 13/02 |
| WO | 2017076989 A1 | 5/2017 | |

\* cited by examiner

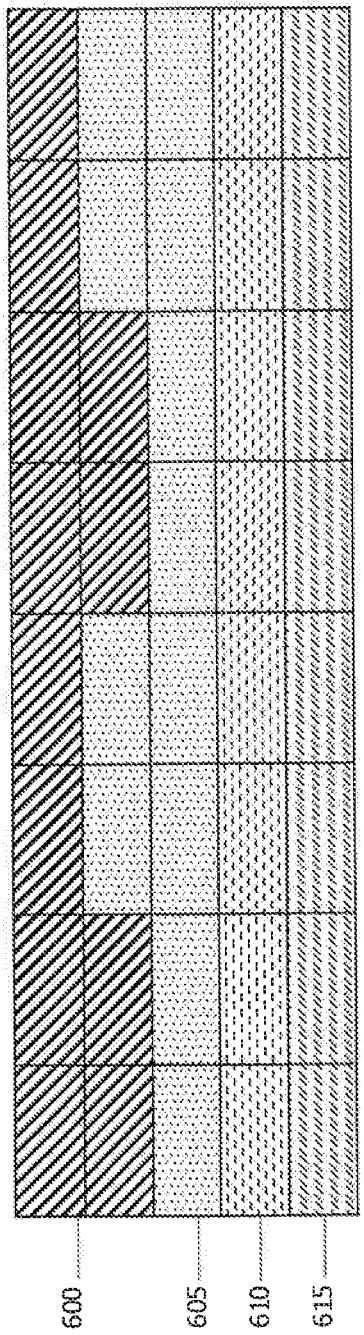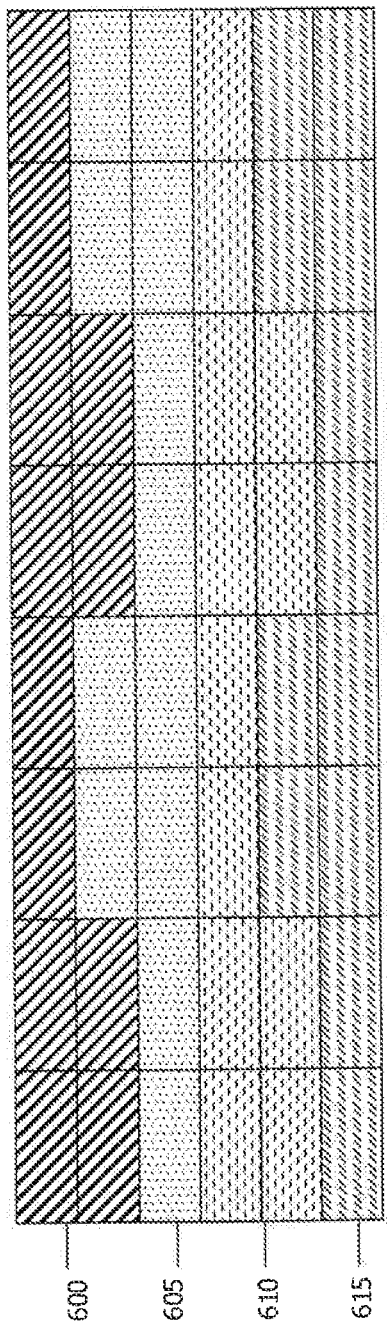
Fig. 7a
Fig. 7b

| t | 1 | 2 | 3 | 4 | 4 | 4 | 5 |
|---|---|---|---|---|---|---|---|
| p | - | 3 | 4 | 5 | 6 | 7 | 7 |
| s | - | 3 | 4 | 5 | 6 | 7 | 7 |

See Fig. 7a and e
See Fig. 7b and c
See Fig. 7d

APPARATUSES AND METHODS FOR OPERATING AT LEAST TWO TOOLS

CROSS-REFERENCE TO RELATED APPLICATIONS

This application is a National Stage application of International Application No. PCT/EP2021/073376 filed on Aug. 24, 2021, which claims priority to German Patent Application Serial No. DE 10 2020 005 484.6 filed Sep. 7, 2020.

BACKGROUND

Field

Apparatuses for operating at least two tools are presented here. The at least two tools are operated in a first and at least a second processing area of the apparatus. Associated methods are also presented.

Discussion of the Related Art

When transferring electronic components, in particular chips and especially when transferring individual electronic components, there is a general problem that these can be easily damaged and must therefore be handled with great care. In addition, electronic components are subject to continuous miniaturization, so that the requirements for accuracy in the transfer of electronic components are continuously increasing. In addition, the requirement for the number of (electronic) components transferred per unit of time (throughput) is increasing.

DE 103 49 847 B3 describes a positioning apparatus and a positioning method for the transfer of electronic components. A semiconductor wafer arranged on a carrier foil is arranged above and parallel to a tape-like substrate. The wafer can be displaced within the wafer plane by means of a wafer holder and can additionally be rotated about an axis of rotation perpendicular to the wafer plane. An ejecting apparatus comprises an ejecting needle which acts by means of a downward movement on the back of the chip to be detached and detaches it from the carrier foil. The chip detached from the carrier foil is subsequently deposited on a bond position on the tape-like substrate.

WO2017/076989 A1 relates to a processing system and method for processing a flexible substrate, for example a track using a tensioner having a vacuum plate movable along a transportation direction of the flexible substrate with an indexer that intermittently moves the flexible substrate for processing. The vacuum plate is adapted to be moved along the transportation direction. An indexer is adapted to intermittently move the flexible substrate for processing. A controller is adapted to control the tensioner and the indexer to maintain a relative speed between the indexer and the vacuum plate of the tensioner above a predetermined threshold under all working conditions, even when the flexible substrate is stopped. The track, which may be used in the processing system, has a number of electrical structures separated by a distance. These electrical structures may be any type of flexible electronics.

DE 10 2011 104 225 B4 relates to an apparatus for positioning electronic components to be transferred relative to an ejector, with the ejector comprising a slider for at least one electronic component and a housing surrounding the slider, the housing having a first light-transmissive region. A first carrier provides the electronic components to be transferred. The first carrier has a first side facing the ejector and a second side facing away from the ejector. A plurality of the electronic components provided on the second side. An image data acquisition apparatus is adapted to acquire, through the first translucent region of the housing, image data of a region in which the slider is adapted to interact with the at least one electronic component. A controller is adapted to determine position data of the electronic component to be transmitted from the captured image data and to generate control commands based on the position data. At least one actuator is adapted to move the first carrier and the ejector relative to each other based on the control commands to change an offset between a longitudinal axis of the slider and a central axis of the electronic component to be transferred, wherein the ejector comprises a first mirror arranged inside the housing.

JP 2003-109979 A concerns an apparatus with at least two sliders for separating components from a first carrier. The components are each picked up by a suction pipette of a transfer element. In a final step, the transfer element, together with suction pipettes and components, is positioned over a second carrier, which has already been prepared with adhesive, and the components are deposited on the second carrier. The components are not transferred directly from the first carrier to the second carrier, but are picked up after separation from the first carrier by means of a transfer element, and in a subsequent step are precisely oriented by the transfer element and attached to the second carrier.

Other apparatuses and methods for transferring electronic components, which form technological background to the apparatus and method described herein, are described in JP 5267451 A, EP 0 565 781 B1 and DE 198 22 512 A1, U.S. Pat. No. 4,667,402 B1, US 2008/0086874 A1, EP 2 764 826 A1, US 2002/0019074 A1, US 2009/242124 A1, EP 0 140 126 A1, U.S. Pat. No. 4,990,051 B1, DE 198 22 512 A1, US 2006/237142 A1, US 2007/293022 A1, U.S. Pat. No. 6,201,306 B1, JP 2009-238881 A, JP 2010-161155 A, U.S. Pat. No. 4,667,402 B1, JP 60-097634 A, JP 01-109737 A, JP 55-070041 A, JP 2002-050670 A, JP 09-162204 A, JP 53-100765 A, JP 2003-109979 A, JP 2008-004936 A, WO 2007/137888 A1, WO 2000/014789 A1, EP 949 662 A2, US 2006/013680 A1, US 2016/308269 A1, DE 10 2011 017218 A1, EP 2 491 583 B1.

To increase the throughput of the apparatus, for example, an approach is to convey an endless belt with several tracks of components arranged next to each other by means of several transfer apparatuses arranged one behind another in an assembly line. Each transfer apparatus contains a tool, for example in the form of a prebonder, which assembles further components with the respective first components. This increases the throughput of the entire assembly line. Each tool in the line works on a section of a multi-row strip material, for example, a tool processes rows 1 and 2 on a material with 8 rows.

However, this type of processing leads to an unfavorable effect. Since all transfer apparatuses/tools in the assembly line are arranged one after the other in the conveying direction of the strip material or the component web, and the buffer capacity between the transfer apparatuses is limited, delays can occur depending on the processing times of the individual tools. In addition, all transfer apparatuses in the assembly line must adapt to the feed rate or to the processing time of the slowest tool.

This means that the number of rows or tracks has a great influence on the throughput of the assembly line. As long as a tool only processes complete rows, e.g. in an assembly line with four tools and a strip material with five component rows, one of the tools must process two rows and the remaining three tools one row each. The tool that processes two rows determines the overall conveying speed of the strip material. Therefore, the three tools in the other rows can only process one part at a time (and wait for some time), while the tool that processes parts in two rows is busy throughout the process. As a result, the three tools with only one row assigned cannot use their full throughput potential. Compared to a same assembly line with a 4-row strip material, throughput can drop by up to 50%.

The problem concerns assembly lines with at least two coupled tools. The objective is therefore to provide an apparatus that allows a higher assembly throughput in an assembly line where a tool is associated with more than one row of components to be machined.

For this purpose, an apparatus with the features of claim 1 is proposed here. This apparatus serves for the operation of at least two tools in a first and at least one second processing area, in each processing area, a number of machining locations are assigned to the respective tool, by which first components, which are carried by a component web, are conveyed along a track through the first and the at least second processing area. Furthermore, the total number of tools in the apparatus is less than the number of machining locations in each processing area. In addition, the track includes a number of partial paths equal to the number of machining locations. Furthermore, for example, the tool of each processing area can be adapted to mount second components to first components at each associated machining location in its processing area.

The apparatus preferably comprises a control unit adapted to position the tool at one or more of the machining locations in its processing area depending on a conveying movement of the component web along the track. The control unit is further adapted to operate the tool to, for example, mount a first or second component at the respective machining location.

The control unit may further be adapted such that in the first area, selected first components that are conveyed on the component web along a first partial path and selected first components that are conveyed on the component web along a second partial path are processed by the tool of the first area. The control unit is further adapted so that, in the second area, selected first components that are conveyed on the component web along a third partial path and the first components that are conveyed on the component web along the second partial path and are not machined in the first area are machined by the tool of the second area.

In one variant, the apparatus has, for example, two sources of second components (each in the form of a wafer) from which second components are transferred to the plurality of, for example, three rows of first components. From each of the sources (wafers), second components are transferred to two rows of first components, but not to more than two (for example, three), although the respective source could also be positioned in the apparatus to more than two (for example, up to the third) row(s) of first components.

In some variants, the selected first components are all components in the partial path. This allows the tools to work in a way that is most efficient for the partial path on which the tools are working. The apparatus can lead to an increase in the capacity utilization of the individual tools by enabling the joint use of partial paths. This can lead to tools no longer machining individual rows completely, but only partially. A subsequent tool can then machine the still unmachined machining positions in the row, so that the row is finally completely machined (for example, a second component is mounted on a first part of the row).

This can result in the apparatus enabling the highest throughput of the assembly line. In this case, two tools share a partial path, with the second partial path being adjacent to both the first partial path and the third partial path. This can allow a higher throughput of the assembly line because the tools do not have to cross two partial paths in order to work on a common partial path.

In some examples, the component web, which is conveyed along the track through the first and the at least second processing area, is conveyed by a transport function intermittently or continuously. This allows the component web to be stopped among the at least two tools to ensure that the machining is more accurate, since the tools do not have to work with a continuously moving track. It can also allow continuous movement of the component web, which can lead to higher throughput of the assembly line.

In some variants, the control unit of each processing area is coupled to a main control unit. This allows for the control units to be synchronized with each other if necessary, so that no processing areas are machined twice. It can also allow for changes in the processing method if the track varies in width and/or the number of partial paths and/or the number of machining locations changes depending on, for example, the number of rows on the component web. It can therefore enable a more flexible apparatus that can process a variety of different component webs.

In some variants, the total number of tools of the apparatus and the number of machining locations in each processing area obey the mathematical relationship $t<p\leq\text{floor}(1.5\,t)$. In this mathematical relationship, t is equal to the total number of tools in the apparatus and p is equal to the number of machining locations in each processing area (or equal to the number of rows of first components on the component web). Adherence to this relationship can allow for more efficient throughput, as no tool will machine more than two locations on the component web.

Furthermore, in another variant, the total number of tools and the number of machining locations additionally obey the equation $p=1.5\,t$. This may allow for the most efficient throughput, with each tool machining one machining location entirely on its own and sharing the second machining location with a second tool. The tools can therefore be used to the full extent.

In some variants, the tool of the first processing area moves in response to the tool of the second processing area. This can allow efficient control of the tools, since the movement does not depend on another tool. This in turn can lead to a higher throughput of the assembly line.

In some variants, the control unit is further adapted to operate the tools such that the tool of the first processing area machines the first components of the second partial path. Additionally, the tool of the second processing area machines subsequent b first components of the second partial path, and where b is an integer.

Alternatively, the control unit is further adapted to operate the tools such that the tool of the first processing area machines b first components of the second partial path. In addition, the tool of the second processing area subsequently machines c first components of the second partial path, where b and c are integers, and b #c.

This allows the tools to machine the partial paths and their respective machining locations in a more efficient manner if the number of partial paths and/or machining locations changes. It can also allow more efficient throughput if the first components at each machining location and/or on each partial path are not identical.

In some variants, one or more of the first components and/or one or more of the second components are electronic components.

In some further variants, at least one of the first electronic components and/or second electronic components is an (RFID) antenna or ladder structure. Then, at least one of the first electronic components and/or second electronic components is an (RFID) chip compatible with the (RFID) antenna or a component suitable for emitting light.

In some variants, the number of partial paths is an integer factor of the number of machining positions. This allows for multiple machining locations within a single partial path. This can allow for more efficient throughput if the first and/or second components in each partial path are not identical, and the machining of these components takes different amounts of time.

In some variants, the control unit is further adapted to receive information about whether or not the first component conveyed on the component web along the second partial path has been machined. This can result in fewer errors occurring during processing, as the control unit receives information about the processing status of each component. This can lead to a reduction in the number of machining locations that have to be machined twice.

In further variants, the control unit receives the information by optical means. This optical means can be a camera, which can obtain information about the processing status of each component by means of UV light, infrared light or by other means.

In some variants, the number of machining locations assigned to each tool in its respective processing area depends on the time required for the tool to move from one of the machining locations to the next, and possibly on the conveyance of the component web through the processing area. Taking this into account when sequencing the machining locations approached by a tool allows for higher throughput of the apparatus, as the tools can be used very efficiently.

In some variants, the apparatus includes a marking unit adapted to mark one or more of the first and/or second components. This allows the control unit of each respective processing area to check whether the first component in the common partial path is to be machined by the tool in its processing area. This allows constant and automatic adaptation to the component web and its machining status. In this way, errors in the machining process can be reduced.

In some further variants, the main control unit controls the marking unit. In this way, the main control unit can precisely determine the first components that each tool processes. In some other variants, there is no marking unit because the component web is already marked before it enters the apparatus.

In some variants, the apparatus includes one or more inspection units adapted to inspect one or more of the components before and/or after machining in one or more of the processing areas. When an inspection unit is placed at a location before the tool machines a first component and a second component, the inspection unit can match the marking on the first and/or second component with information in the control unit of a processing area. For example, if an inspection unit is placed at a location downstream of the tool, the inspection unit may check the placement of the second component to ensure that it has been correctly machined. Additionally or alternatively, the inspection unit may inspect any feature even if it is not marked. In some further variants, the inspection unit may check whether the second component has been correctly placed relative to/on the first component without referring to a marking on or at either of the components.

In some variants, the apparatus includes an adhesive application unit adapted to apply adhesive to one or more of the first components. The adhesive can provide a more secure (and possibly electrically conductive) attachment of the second components to the first components. The adhesive application unit may receive instructions from the main control unit, or alternatively may be a separate control unit that is independent of the main control unit or control units.

In some variants, the transport function (conveyor drive) receives instructions from the main control unit. This can enable the main control unit to slow down or stop the component web, for example if an error occurs in the machining process.

In some variants, the tools are prebonders adapted to prebond one or more corresponding second components with one or more corresponding first components.

In some variants, the apparatus includes an epoxy application unit that is used to apply epoxy resin to one or more of the processed components. This allows the processed components to be bonded and/or protected from external influences.

In addition, a method having the claimed features is proposed herein.

Such a method serves to operate at least two tools in a first and at least a second processing area. The respective tool in each processing area is assigned a number of machining locations by which first components carried by a component web are conveyed along a track through the first and the at least second processing area. Furthermore, the total number of tools in the process is less than the number of machining locations in each processing area. Additionally, the track includes a number of partial paths equal to the number of machining locations. Furthermore, each tool is adapted to mount second components to corresponding first components at each machining location in its processing area.

In one variant, the method includes configuring a control unit to position the tool at one or more of the machining locations in its processing area in response to a conveying motion of the component web along the track.

In addition, the control unit may be further adapted to operate the tool to assemble a first component or a second component at the respective machining location. The control unit may further be configured such that, in the first area, selected first components conveyed along the component web along a first partial path and selected first components conveyed along the component web along a second partial path are machined by the tool of the first area. The control unit is further configured such that, in the second area, selected first components that are conveyed on the component web along a third partial path and the first components that are conveyed on the component web along the second partial path and are not machined in the first area are machined by the tool of the second area.

The process can lead to an increase in the capacity utilization of the individual tools by enabling partial paths to be shared. This can lead to tools assembling individual rows only partially rather than completely. A subsequent tool can then equip the still unmachined machining locations so that the row is finally completely assembled.

This can lead to a process that allows high throughput of the assembly line. In this pattern, two tools share a partial path that connects to the other partial paths that the respective tool must also machine.

In some variants, the second partial path is adjacent to both the first partial path and a third partial path. This can enable a higher throughput of the assembly line, as the tools do not have to cross two partial paths in order to machine the common partial path.

In addition, a second apparatus having the features of claim 16 is proposed herein. This apparatus is for operating at least two tools in a first and at least a second processing area, in each processing area a number of machining locations is associated with the respective tool through which first components carried by a component web are conveyed along a track through the first and the at least second processing area. Furthermore, the total number of tools in the apparatus is greater than the number of machining locations in each processing area. In this regard, the track includes a number of partial paths equal to the number of machining locations. In addition, for example, the tool of each processing area may be adapted to mount second components to first components at each associated machining location in its processing area.

The apparatus preferably comprises a control unit adapted to position the tool at one or more of the machining locations in its processing area in response to a conveying movement of the component web along the track. The control unit is further adapted to operate the tool, for example, to mount a first or second component at the respective machining location.

The control unit may be further adapted such that, in the first area, selected first components conveyed on the component web along a first partial path and selected first components conveyed on the component web along a second partial path are processed by the tool of the first area. The control unit is further adapted such that, in the second area, selected first components that are conveyed on the component web along a third partial path and the first components that are conveyed on the component web along the second partial path and are not machined in the first area are machined by the tool of the second area.

The apparatus can lead to an increase in the capacity utilization of the individual tools by enabling the joint use of partial paths. This can lead to tools no longer machining individual rows completely, but only partially. A subsequent tool can then machine the remaining unmachined machining locations in the row, so that the row is finally fully machined (for example, a second component is mounted on a first machined part in the row). This can result in the apparatus enabling the highest throughput of the assembly line.

In some variants, the selected first components are all components in the partial path. This allows the tools to operate in a way that is particularly efficient for the component track on which the tools are operating.

In some variants, the second partial path is adjacent to both the first and third partial paths. This can allow for higher throughput of the assembly line because the tools do not have to cross two partial paths to machine a common partial path. In some variants, the minimum two tools work together to machine all the machining locations in the first partial paths.

In some alternative variants, the first partial path and the third partial path are the same partial path. This can allow for high throughput of the apparatus, as the tools machining the partial paths may not need to travel back and forth between the partial paths, reducing the dwell time of the tools.

In some variants, the number of machining locations is an integer factor of the number of tools. This makes it possible for multiple tools to machine a single partial path. This can allow efficient throughput when the first and/or second parts in each partial path are not identical and require different tools to machine them.

The second apparatus may also include aspects described with respect to the first apparatus, provided they are compatible.

Although some of the aspects described above relate to the apparatus, these aspects may also relate to the method and vice versa.

In some variants, buffer areas for the component web are provided between individual or all processing areas of the apparatuses in order to compensate for differences in the movement sequence of the component web at the successive processing areas. These differences are caused by any different time requirements of the respective tools (i) during machining at the machining locations and/or (ii) when changing from one partial path to the next.

BRIEF DESCRIPTION OF THE DRAWINGS

The above and other aspects of the solution are described below for explanation by means of the drawings, where the same reference signs refer to the same parts, and in which:

FIG. 7a to g show schematic representations of various processing patterns according to some variants described herein;

FIG. 8 shows a table of the total number of tools, machining locations, and partial paths according to some variants described herein.

DETAILED DESCRIPTION OF THE EMBODIMENTS

Figure 1:
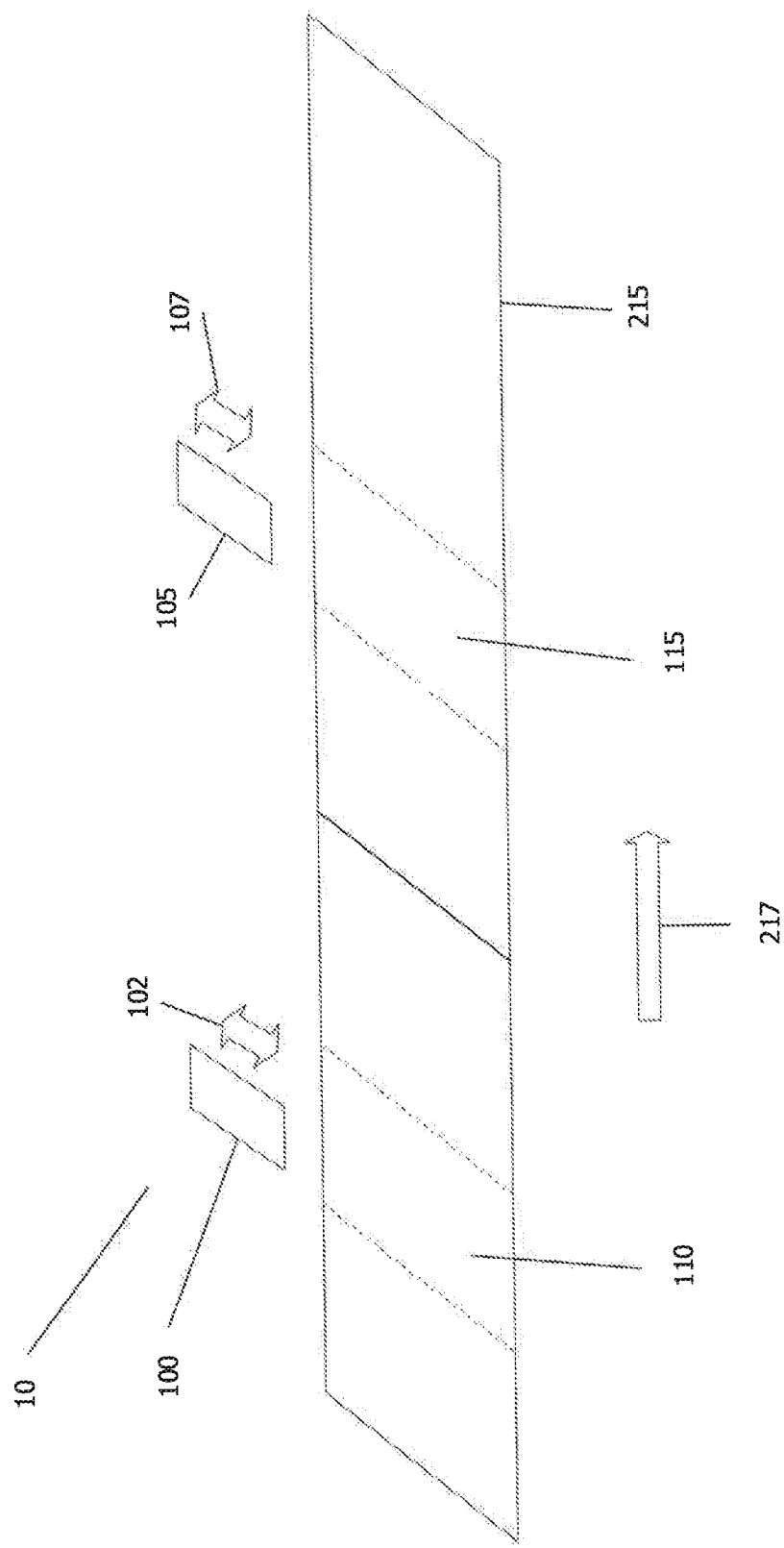
FIG. 1 shows a perspective view of a schematic representation of an apparatus for operating at least two tools according to a variant described herein.

FIG. 1 shows a perspective view of a schematic representation of the apparatus for operating at least two tools according to a variant disclosed herein.

In FIG. 1, the apparatus 10 includes two tools 100, 105 adapted to move in the direction of their respective arrows 102, 107. The component web 215 is adapted to move from left to right in the direction of the arrow 217. Each tool 100, 105 therefore moves orthogonally to the movement of the component web 215. The movement of the tools 100, 105 and the component web 215 is not limited to the directions shown in this variant.

In this variant, each tool 100, 105 has a corresponding processing area 110, 115. Each tool 100, 105 is limited to movement within its own processing area 110, 115, which is determined by the control unit see FIG. 5 of the area 110, 115. The processing areas 110, 115 in this variant cover the entire component web 215. In some variants not shown, the processing areas 110, 115 do not cover the entire component web 215. In some variants also not shown, more than one tool 100, 105 is located in the same processing area 110, 115.

In this variant, each tool 100, 105 has a needle, a component supply with second components (see FIG. 2), and a receptacle for the component supply. In some variants, each tool has only some of these components, or a point laser source instead of the needle. The apparatus is positionable together with the component supply in the x-direction, the y-direction and in the rotational direction. In some variants, the apparatus is positionable in only some of these directions. The second components (see FIG. 2) adhere to a support (e.g., a foil or glass plate) with their side facing away from the component web 215 and are transferred to the first components (see FIG. 2) by the needle or laser beam. The second components (see FIG. 2) can be transferred to the first components (see FIG. 2) by any suitable method.

The apparatus 10 is not limited to only two tools 100, 105; it may include any number t (for example, 2 up to 10 or more) tools 100, 105. In some variants, each tool 100, 105 and its respective processing area 110, 115 are located in a separate module. In some variants not shown, multiple tools 100, 105 are within the same housing. In some variants, the tools 100, 105 are, for example, preconnectors (so-called prebonders) adapted to preconnect respective second components see FIG. 2 to respective first components see FIG. 2.

In this variant, each tool 100, 105 is adapted to move with respect to and in dependence of the other tool 100, 105 at least nearly synchronously. In some variants, each tool 100, 105 is at least nearly synchronized with the movement of the other tool 100, 105 by a controller and does not move in dependence on another tool 100, 105.

Figure 2:
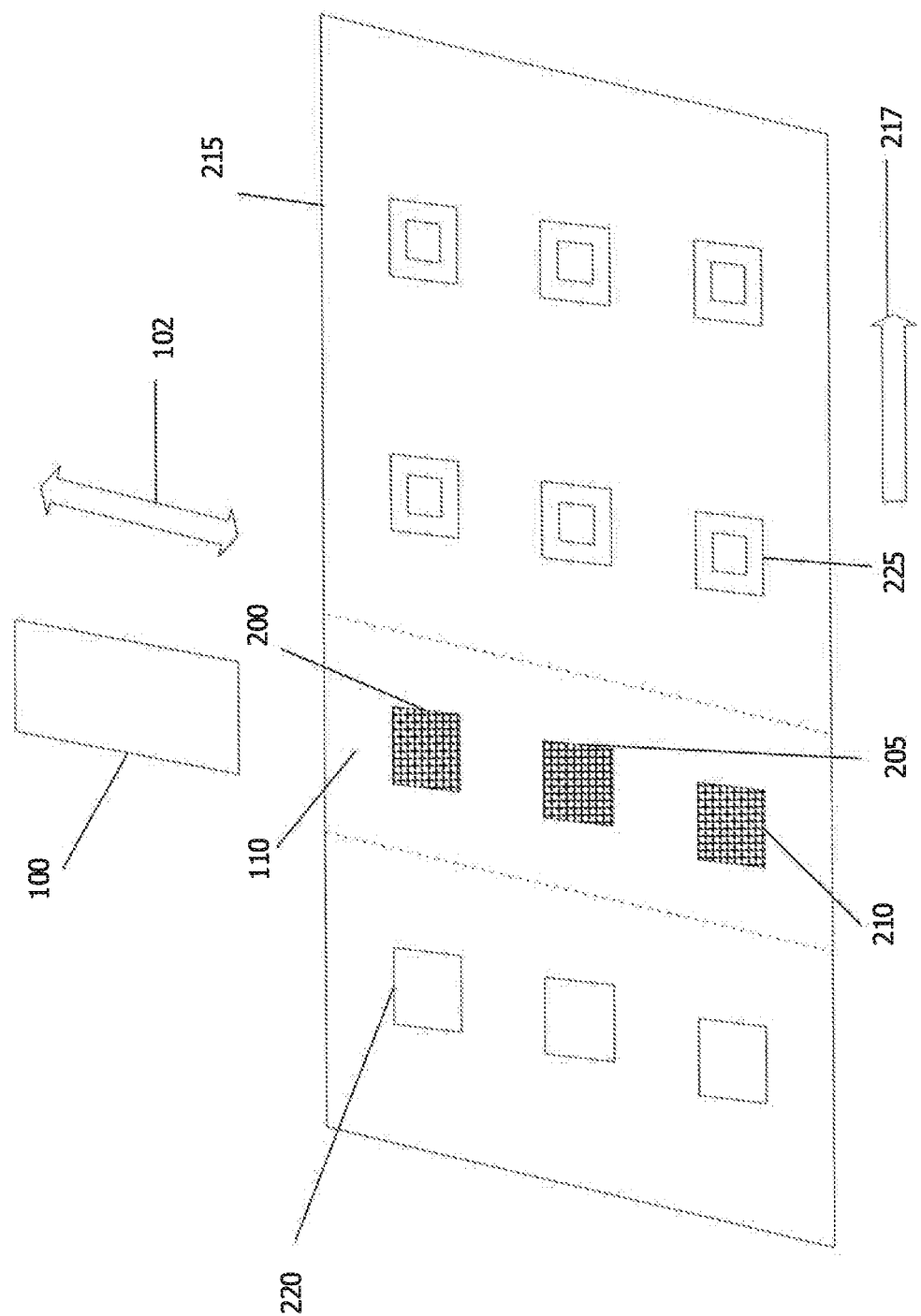
FIG. 2 shows a perspective view of a schematic representation of one of the processing areas according to a variant described herein.

FIG. 2 shows a perspective view of a schematic representation of one of the processing areas according to a variant described herein.

In the variant of FIG. 2, there are three machining locations 200, 205, 210 in the processing area 110 of the tool 100. Let it be understood that the apparatus may include more than three machining locations 200, 205, 210. In some variants, the tool 100 does not machine all of the machining locations 200, 205, 210 in its processing area 110. Let it be understood that each processing area includes multiple machining locations, such as three machining locations, but that the tool only machines two of those machining locations. In this regard, the tool need not machine all of the machining locations. Rather, one or more of the tools is limited to machining only one or some of the machining locations 200, 205, 210 in its processing area 110.

A component web 215 to be processed in the apparatus 10 has a plurality of rows of first 220 and second 225 components, and each row of components is guided at/by a machining location 200, 205, 210. In this variant, there are three rows of components 220, 225 and three machining locations 200, 205, 210. The number p of machining locations 200, 205, 210 may vary according to the number of rows of components 220, 225 on the component web 215. In this variant, the second components 225 are placed on the first components 220 during processing. In some other variants, the second components 225 are placed on the first components 220 prior to processing.

In this variant, the first components 220 are conveyed by the component web 215 through the processing area 110 and second components 225 are placed on the first components 220 prior to or during processing by the tool 100. In some variants, second components 225 are separated from first components 220 by a support layer.

In some variants, the second components 225 are held to a support layer and approached on a second component web over the first components 220.

Figure 3A:
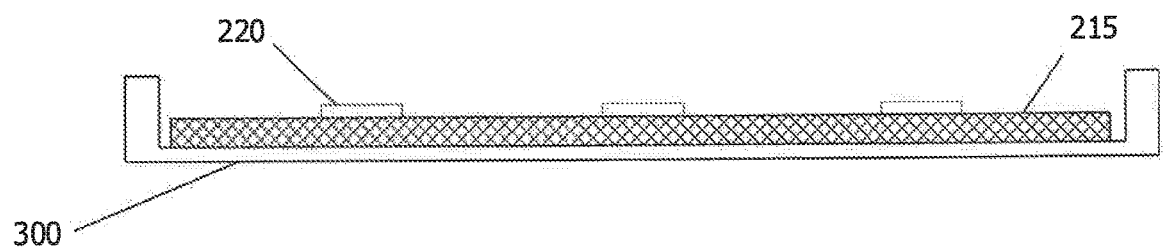
FIGS. 3a and b show a cross-sectional view of a schematic representation of the track and component web according to some variants described herein.
Figure 3B:
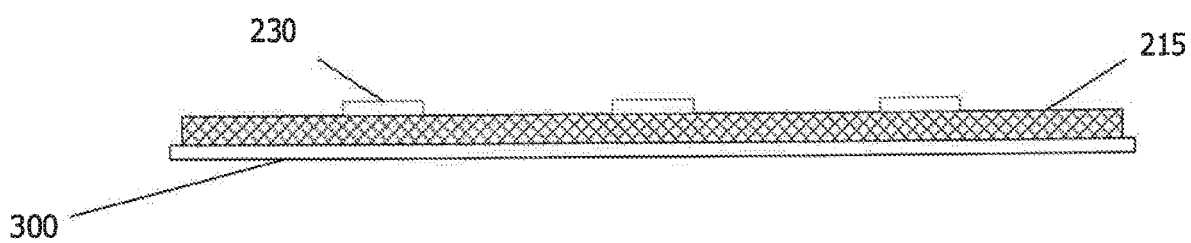
Figure 4:
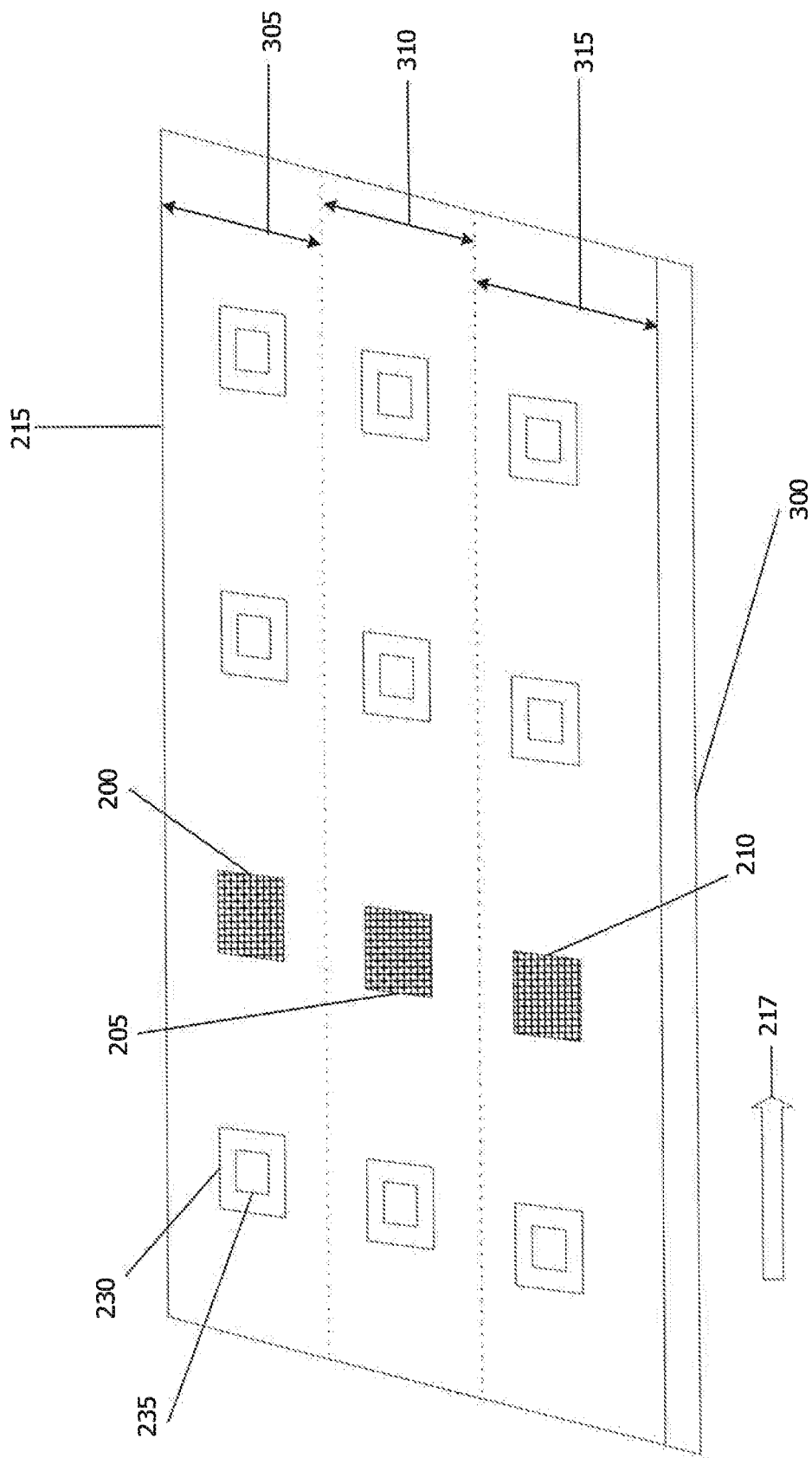
FIG. 4 shows a perspective view of a schematic representation of the component web and the track corresponding to a variant described herein.

In some variants, one or more of the first 220 and/or second 225 components are electronic components, see FIG. 3b and FIG. 4. The machining/processing of the first and/or second component is performed depending on what type of component the first and/or second component is. In some variants, the machining/processing includes mechanical actuation means, heating means and/or light means and/or ultrasonic means and/or any other suitable means.

In some variants, one or more of the first and/or second electronic components are (RFID) antennas and one or more of the first and/or second electronic components are chips. In some variants, the chips are RFID chips.

FIGS. 3a and b show a cross-sectional view of a schematic representation of the track and component web according to some variants described herein.

In the variant of FIG. 3a, the track 300 is U-shaped, with the component web 215 is conveyed through the apparatus between respective lateral legs of the U-shaped track. The track 300 may be made of any suitable low friction material that allows the component web 215 to move unimpeded/easier along the track 300. In the variant of FIG. 3b, the track 300 is a flat plane. In another variant, the track is a vacuum drum that conveys the component web 215. In variants where there are vacuum drums or a curved support per module, the track is a web curve. In some other variants, there is no physical track 300, and the track 300 is an imaginary plane under the component web 215. In this variant, the first components are electronic components 230. The track is what the component web is on. Thus, there is a single track on which the component web moves through the entire apparatus.

FIG. 4 shows a perspective view of a schematic representation of the component web and the track corresponding to a variant described herein.

In the variant of FIG. 4, the component web 215 is located on the track 300 shown in FIG. 3b and is conveyed along this track 300 in the direction of arrow 217. In this variant, the track 300 is divided into three partial paths 305, 310, 315, which correspond to the three machining locations 200, 205, 210. Thus, in each partial path 305, a machining location 200 is present and a series of first 230 and second 235 electronic components are conveyed along when the second components 235 are already placed. Thus, partial path 305 is a first row of antennas, partial path 310 is a second row, and partial path 315 is a third row. In some variants, there is more than one machining location 200, 205, 210 in each partial path 305, 310, 315. In some variants, the numbers of partial paths 305, 310, 315 is an integer factor of the number p of machining locations 200, 205, 210. In some variants, the number p of machining locations 200, 205, 210 in each partial path 305, 310, 315 is not equal. In some variants, the number s of partial paths is determined by the control unit (see FIG. 5) of each processing area 110, 115 or the main control unit (see FIG. 5). A partial path is a series of antennas. For example, partial path 305 is a first row of antennas, partial path 310 is a second row, and partial path 315 is a third row.

Figure 5:
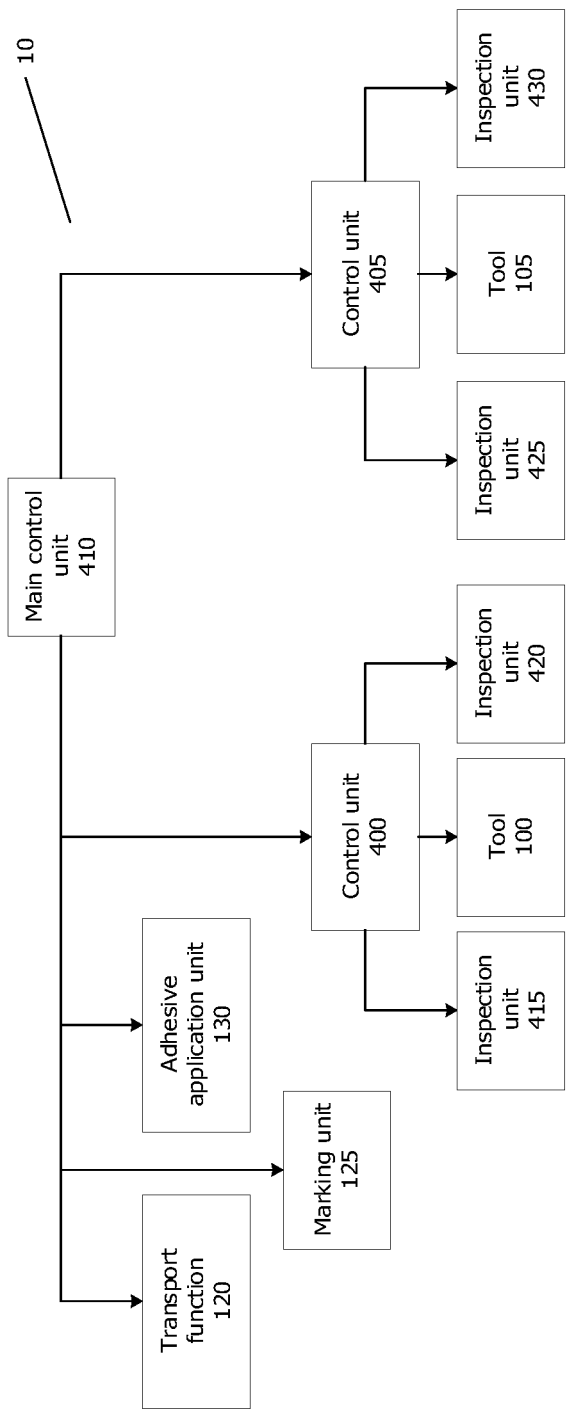
FIG. 5 shows a block diagram of the apparatus according to a variant described herein.

FIG. 5 shows a block diagram of the apparatus according to a variant described herein.

In the variant of FIG. 5, the control unit 400, 405 of each tool 100, 105 is coupled to a main control unit 410. In some variants, the main control unit 410 can receive and process inputs from an external program or inputs from an operator. In some variants, the main control unit 410 has no external operator inputs. In some variants, the control unit 400, 405 controls more than one tool 100, 105.

In this variant, the main control unit 410 is coupled to the transport function 120. This transport function 120 is adapted to convey the component web 215 through the apparatus 10. The transport function 120 may convey the component web 215 either continuously or intermittently, depending on the desired movement. In some examples, the transport function 120 is independent of the main control unit 410.

In this variant, the main control unit 410 is coupled to a marking unit 125. The main control unit 410 controls the marking of the first 220, 230 and/or second 225, 235 component with one or more indicators by the marking unit 125 as the components 220, 225, 230, 235 pass through or under the marking unit 125. These indicators may indicate to the control unit 400, 405 of each tool 100, 105 whether the components 220, 225, 230, 235 need to be processed by their respective tool 100, 105. In some variants, the marking unit 125 provides information to the main control unit 410 indicating components 220, 225, 230, 235 with one or more indicators and the indicators used to mark the components 220, 225, 230, 235. In some variants, each control unit 400, 405 has a corresponding marking unit 125. In some variants, there is no marking unit 125. In some variants, the marking unit 125 is independent of the main control unit 410 and the control units 400, 405.

In the variant of FIG. 5, the main control unit 410 is coupled to an adhesive application unit 130 adapted to apply adhesive to one or more of the first components 220, 230 as the components 200, 225, 230, 235 pass through or under the adhesive application unit 130. The main control unit 410 may send information to the adhesive application unit 130 regarding which first components 220, 230 need to be coated with adhesive. In some variants, each control unit 400, 405 has an adhesive application unit 130. In some variants, the adhesive application unit 130 is independent of the main control unit 410 and the control units 400, 405. In some variants, there is no adhesive application unit 130.

In the variant of FIG. 5, the control unit 400, 405 of each tool 100, 105 is coupled to two inspection units 415, 420, 425, 430. The inspection unit 415, 425 upstream of each respective tool 100, 105 inspects the components 220, 225, 230, 235 to verify whether or not the components 220, 225, 230, 235 have been machined as the components 220, 225, 230, 235 pass through or under the inspection unit 415, 425. The inspection unit 415, 425 then sends this information to its respective control unit 400, 405. The inspection unit 415, 425 may obtain this information via optical means such as a camera or other suitable other optical sensor means. In some variants, the inspection unit 415, 425 receives information about the indicators marked by the marking unit 125 on the components 220, 225, 230, 235 by the same or another optical means.

In the variant of FIG. 5, the inspection unit 420, 430 inspects the components 220, 225, 230, 235 after each respective tool 100, 105 to determine whether or not the components 220, 225, 230, 235 have been correctly machined while the components 200, 225, 230, 235 pass through or under the inspection unit 420, 430. In some variants, the inspection unit 420, 430 also checks whether the placement of the second component 225, 235 is correct. In some variants, the inspection unit 420, 430 then sends this information to its respective control unit 400, 405. In some variants, the control unit 400, 405 may send this information to the main control unit 410. In some variants, the main control unit 410 may override the control unit 400, 405 of a subsequent tool 100, 105 and control it to process a missing component 220, 225, 230, 235. In some variants, the main control unit 410 may trigger an alarm or send a visual notification to an operator to indicate that a component 220, 225, 230, 235 has been missed by the tool 100, 105. In some variants, triggering an alarm or sending a visual notification occurs when the placement of the second component 225, 235 is unsatisfactory. The inspection unit 420, 430 may obtain this information by optical means such as a camera, UV light, infrared light, or any other suitable optical means.

In some variants, each or at least some of the inspection units 415, 420, 425, 430 has at least one camera and optionally at least one light source and one deflection mirror. The inspection unit 415, 420, 425, 430 or at least parts of the inspection unit 415, 420, 425, 430 (if a light source and deflection mirror are provided) before and/or after a respective tool 100, 105 may be positioned orthogonal to the movement of the component web 215 for image capture.

In some variants, there are inspection units 415, 420, 425, 430 upstream and/or downstream of a plurality of tools 100, 105. In some variants, there is an inspection unit 415, 420, 425, 430 at the beginning of the apparatus 10 and at the end of the apparatus 10. In some variants, there are no inspection units 415, 420, 425, 430 in the apparatus 10.

In some variants, the main control unit 410 is coupled to an epoxy application unit (not shown) adapted to apply epoxy resin to components 220, 225, 230, 235 to be processed as the components 200, 225, 230, 235 pass through or under the epoxy application unit. The main control unit 410 can send information to the epoxy application unit indicating which machined components need to have epoxy applied. In some variants, each control unit 400, 405 includes an epoxy application unit. In some variants, the epoxy application unit is independent of the main control unit 410 and the control units 400, 405. In some variants, there is no epoxy application unit.

In some variants, each control unit 400, 405 and their respective tool 100, 105 and inspection units 415, 420, 425, 430 are in a separate module that is independent of, but coupled to (upstream and downstream) the other modules of the apparatus 10. In some variants, multiple control units 400, 405 and their respective components are located in the same module. In each such case, each module is coupled to the main control unit 410. In some variants, the entire apparatus 10 is a module.

In some variants, a main control unit interface 410 is provided on the apparatus 10. The interface would allow a user to obtain information about the apparatus 10 and enter parameters and/or instructions. In some variants not shown, the apparatus 10 also includes a short-range transceiver used to transmit information about the apparatus 10 to a mobile apparatus. The short-range transceiver would also allow input to the main control unit 410 to be received from a mobile apparatus. In some variants, the main control unit 410 is connected via Ethernet, fieldbus, etc. to an interface and/or any other suitable equipment for remote monitoring and control.

In some variants, each control unit 400, 405 and/or each inspection unit 415, 420, 425, 430 and/or the transport function 120 and/or the marking unit 125 and/or the adhesive application unit 130 and/or the epoxy application unit has its own interface. Each of these interfaces may be associated with the apparatus and/or use a short-range transceiver to send and receive information from a mobile apparatus and/or be connected via Ethernet and/or any other suitable means for remote monitoring and control.

The apparatus 10 may include some or all of the above components. The above components may execute their respective processes in a different order than described above, and some of the components may execute their processes simultaneously.

Figure 6:
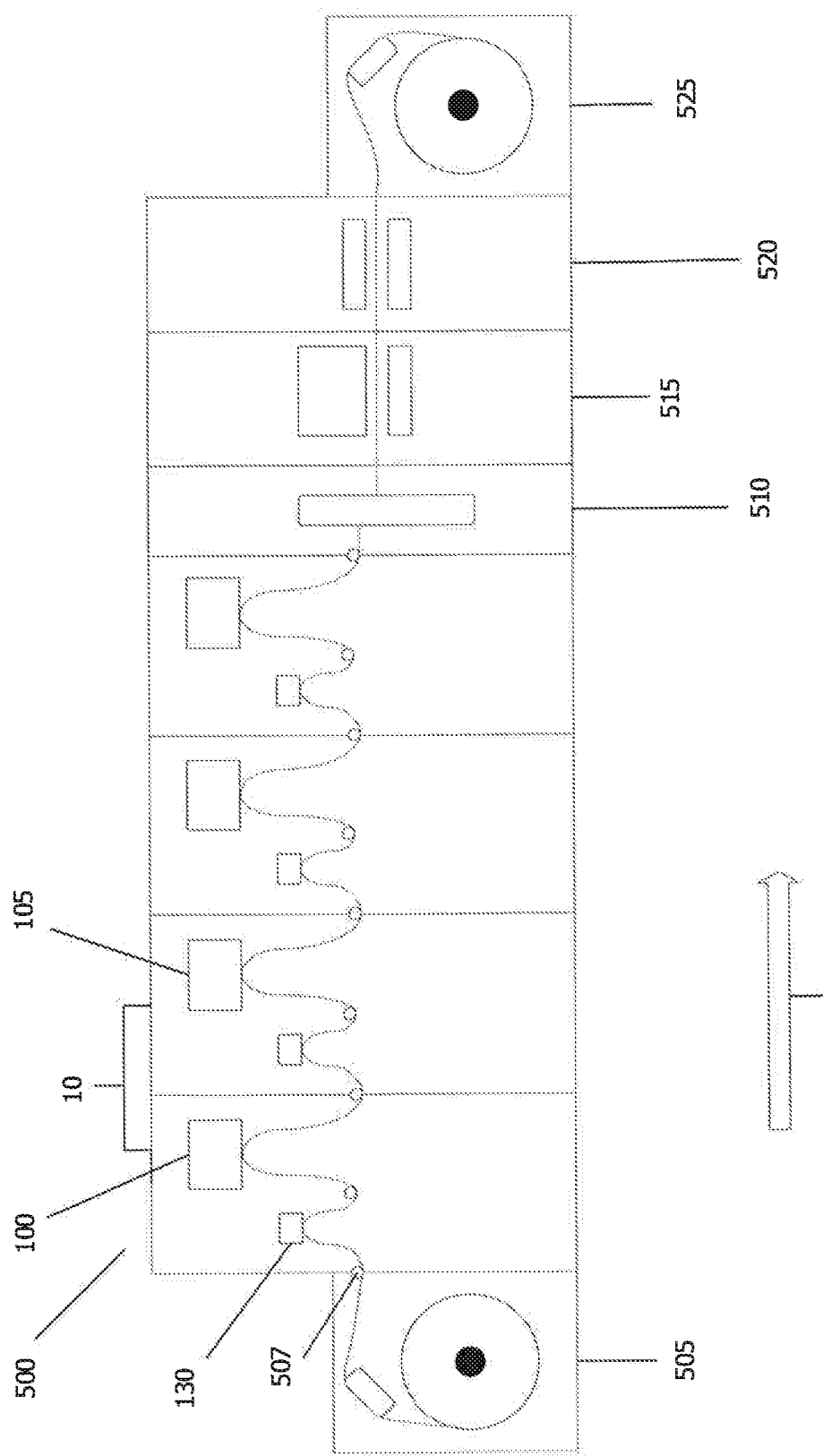
FIG. 6 shows a schematic representation of a part of an assembly line corresponding to a variant described herein.

FIG. 6 shows a schematic representation of the apparatus as part of an assembly line corresponding to a variant described herein.

In the variant of FIG. 6, there are two implementations of the apparatus 10 as shown in the variant of FIG. 1. There is no limit to the number of modules 10 with respective tools 100, 105 in the assembly line 500 as long as the number of tools 100, 105 in the assembly line 500 is less than the number of machining locations 200, 205, 210 in each processing area 110, 115.

In this variant, there is an unwinding drum 505 adapted to feed the component web 215 into the assembly line 500 in the direction of arrow 502.

In this variant, there are a plurality of transport rollers 507 that are used to guide the component web 215 through the assembly line 500. These rollers 507 are used because there is no physical track 300 in this variant. These rollers 507 convey the component web 215 through each module as unimpeded as possible. Even if a physical track 300 were present, the rollers 507 would be able to guide the component web 215 through the modules.

In some variants, each module (comprising 130, 415, 100, 420) has at least one vacuum drum below the tool 100 for conveying the component web 215 in the direction of arrow 502, or each tool has an associated vacuum drum. A second vacuum drum may be provided below the adhesive application unit 130.

In this variant, the component web 215 is introduced into a buffer module 510 after passing through each of the modules. The buffer module 510 is adapted to buffer the component web 215 in the event that the units downstream of the buffer module 510 fall behind the units upstream of the buffer module 510 in processing the components on the component web 215. In some variants, there is no buffer module 510 in the assembly line 500.

In one variant, a buffer module (not shown) may be disposed in each module between the respective adhesive application unit 130 and the respective tool 100, and downstream of the respective tool 100 and upstream of the subsequent adhesive application unit of the downstream module, or, in other words, upstream and downstream of the respective tool, to temporarily store or delay the component web 215.

In this variant, the component web 215 is then passed through an epoxy resin curing module 515. This final curing module is adapted to place the second components 225, 235 on top of the first components 220, 230 as the components 220, 225, 230, 235 pass through the curing module 515. In some variants, there is no curing module 515 in the assembly line 500.

In the variant of FIG. 6, the component web 215 then passes a test module 520. In some variants, the test module 520 is adapted to verify that the machined components 220, 225, 230, 235 are technically functioning, and/or fully cured as the components 220, 225, 230, 235 pass through the test module 520. In some variants, the test module 520 is adapted to verify that all components 220, 225, 230, 235 have been machined and that the second components 225, 235 are electrically and/or mechanically connected to the first components 220, 230. The test module 520 may be adapted to check for faults or other appropriate parameters of functionality of the components. In some variants, there is no test module 520 in the assembly line 500.

Between the processing areas of the apparatus shown in FIG. 6, buffer areas for the component web 215 are provided in the form of sagging loops of the component web 215. These sagging loops of the component web 215 compensate for differences in the movement sequence of the component web at the successive processing areas. These differences are caused by any differences in the time requirements of the respective tools (i) when machining at the machining locations and/or (ii) when changing from one partial path to the next.

In the variant of FIG. 6, there is a rewinder 525. The rewinder 525 is adapted to wind the component web 215 with the machined components 220, 225, 230, 235. The output of the finished machined web material is not limited to a rewinder 525. (Rectangular) arrays of components may also be output after the finished processed strip material has been divided into corresponding sections.

The assembly line 500 may also include other modules or units.

FIG. 7a to g show schematic representations of different processing patterns according to some variants described herein. Each box corresponds to a first component to be processed, with equally shaded boxes being processed by the same tool.

Very high throughput of the apparatus 10 is achieved in variants where all tools 100, 105 average the same number p of machining locations 200, 205, 210 in a repeating pattern. The optimum repetitive pattern depends on the speed of movement of the tool from component 220, 230 to component 220, 230 in each processing area 110, 115.

In some variants, the time required for the tool 100, 105 to move between rows of components and the time required for the next column of components 220, 230 to be placed under the tool 100, 105 are substantially the same. In these variants, the pattern of the sequence of movements performed by each tool plays a minor role. In contrast, the number p of machining locations 200, 205, 210 that are machined in each repetitive pattern is more important. In some variants, each tool 100, 105 machines the same number p of machining locations 200, 205, 210 in each repeating pattern as the other tools 100, 105.

In some variants, the time required for the tool 100, 105 to move between rows of components is longer than the time required for the next column of components 220, 230 to be placed under the tool 100, 105. In these variants, the sequence of movements performed by each tool 100, 105 includes as few movements between rows of components as possible.

In some variants, the time required for the tool 100, 105 to move between rows of parts is less than the time required for the next column of parts 220, 230 to be placed under the tool 100, 105 includes as few movements between component columns as possible in the sequence of movements performed by each tool 100, 105.

In the variant of FIG. 7a, there are four tools 100, 105, five rows of first components 220, 230 on the component web 215, five partial paths 305, 310, 315, and five machining locations 200, 205, 210 per processing area 110. The tools cannot jump to a common machining location. Each pattern 600, 605, 610, 615 in FIG. 7a corresponds to a tool, i.e., the top pattern 600 corresponds to one tool, the second pattern 605 corresponds to a second tool, and so on. In this variant, the tools 100, 105 associated with the two upper patterns 600, 605 share three machining locations 200, 205, 210 and three partial paths 305, 310, 315. It can also be seen that the tools 100, 105 share a partial path and operate individually on one partial path each. Each of the tools transfers a second component to a first component in its processing area at two machining locations.

In some variants, the shared partial path is not the middle partial path 310 but one of the outer partial paths 305, 315. This variant does not allow the tools 100, 105 associated with the two lower patterns 610, 615 to operate at their maximum efficiency because they must wait for the tools associated with the upper two patterns 600, 605 to complete the sharing of the partial path.

In the variant of FIG. 7b, there are four tools 100, 105, six rows of first components 220, 230 on component web 215, six partial paths 305, 310, 315, and six machining locations 200, 205, 210 per processing area 110. It can be seen that the two upper patterns 600, 605 share three partial paths 305, 310, 315 and the two lower patterns 610, 615 share another three partial paths. This allocation for sharing is most efficient of partial paths. In this variant, the first tool 100 machines two components in each pair in the shared partial path in columns k and k+1. It is then followed by the second tool 105, which machines the following two components 220, 225, 230, 235 in the shared partial path in columns k+2 and k+3. A pair here is two tools working together to machine three rows of antennas. For example, in FIG. 7b, the tools with patterns 600 and 605 are a pair and the tools with patterns 610 and 615 are a second pair.

Figure 7C:
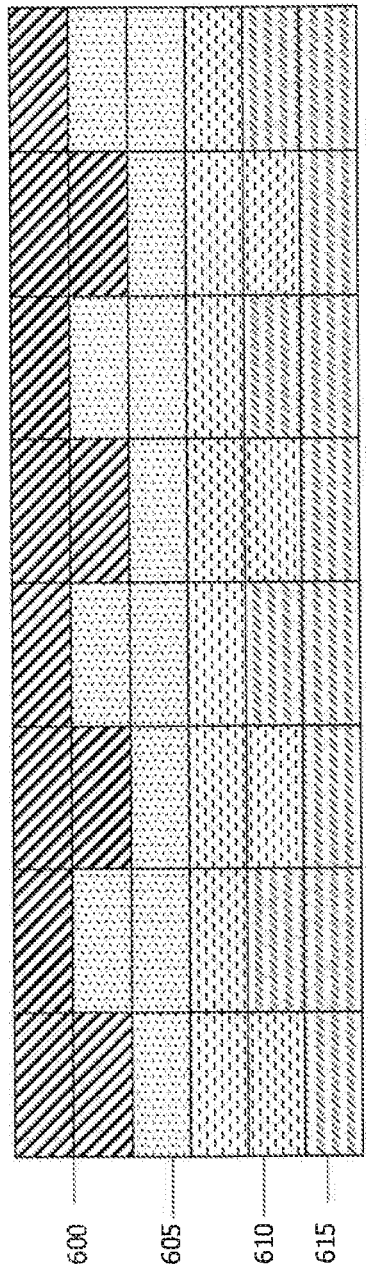

In the variant of FIG. 7c, there are four tools 100, 105, six rows of components 220, 225, 230, 235 on component web 215, six partial paths 305, 310, 315, and six machining locations 200, 205, 210 per processing area 110. The process of FIG. 7c is similar to that of FIG. 7b. However, the first tool 100 and the second tool 105 in each pair alternately machine components 220, 225, 230, 235 in the common partial path. The first tool 100 machines the common partial path in columns k and k+2, while the second tool 105 machines the common partial path in columns k+1 and k+3.

In some variants, the tools 100, 105 each machine more than two consecutive components 220, 225, 230, 235 in the common partial path. In some variants, the common partial path is unevenly shared between the two tools 100, 105. For example, the first tool 100 machines a component 220, 225, 230, 235 in the common partial path, followed by the second tool 105 machining the two subsequent components 220, 225, 230, 235 in the common partial path. These are examples only. The common partial path can also be machined jointly by the tools 100, 105 in other ways.

Figure 7D:
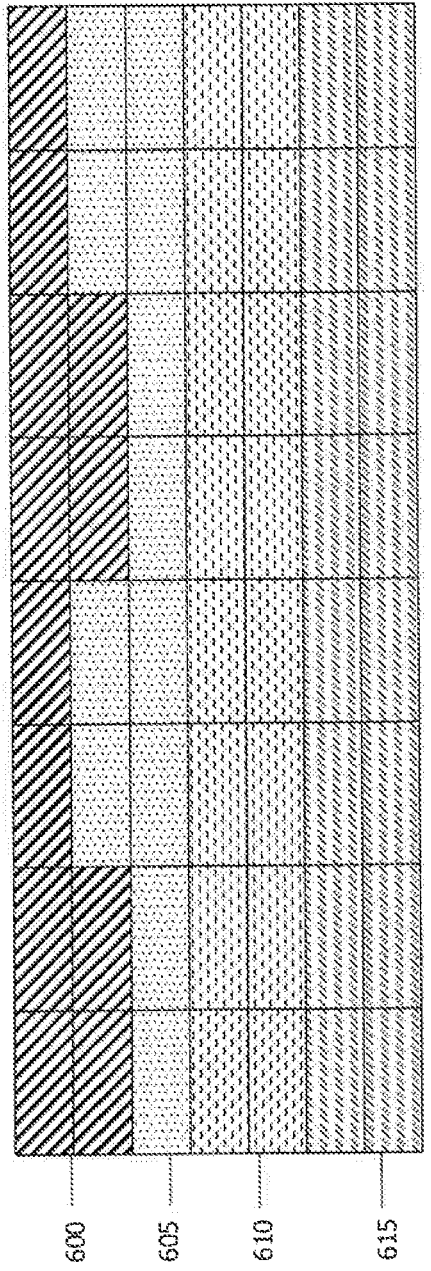

In the variant of FIG. 7d, there are four tools 100, 105, seven rows of components 220, 225, 230, 235 on the component web 215, seven partial paths 305, 310, 315, and seven machining locations 200, 205, 210 per processing area 110. In this variant, it can be seen that the tool 100, 105 associated with the lower pattern 615 is the only tool 100, 105 that machines these two partial paths. This variant does not allow the tools 100, 105 associated with the two upper patterns 600, 605 to operate at their maximum efficiency because they must wait for the tools 100, 105 associated with the two lower patterns 610, 615.

Figure 7E:
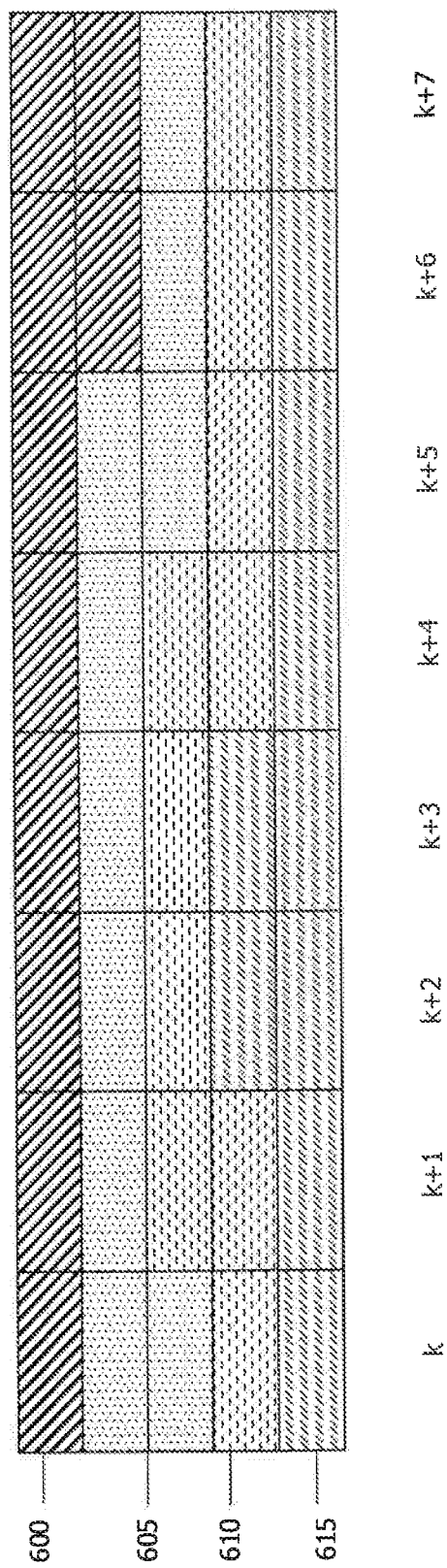

In the variant of FIG. 7e, there are four tools 100, 105, five rows of components 220, 225, 230, 235 on component web 215, five partial paths 305, 310, 315, and five machining locations 200, 205, 210. In this variant, each tool 100, 105 repeats its respective pattern 600, 605, 610, 615 every eight columns and performs the same number of movements between partial paths 305, 310, 315. This results in an even workload for all tools 100, 105 with minimal movement between rows of components. This pattern is particularly preferable for variants where the time required for each tool 100, 105 to move between rows of components is greater than or—substantially equal to the time required for the next column of components 220, 230 to be placed under each tool 100, 105.

Figure 7F:
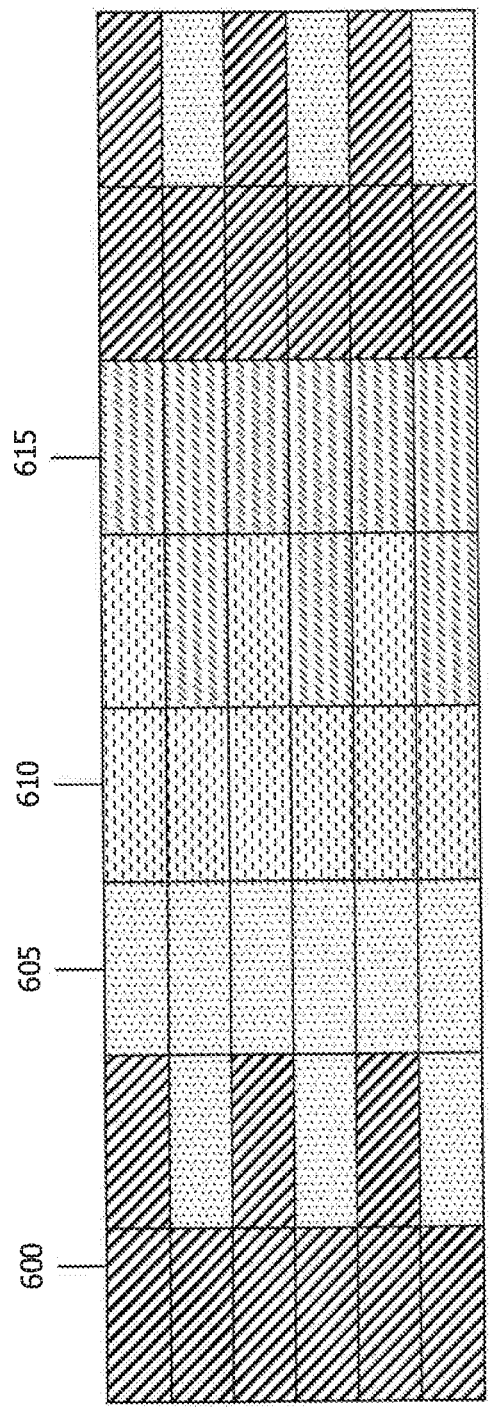

In the variant of FIG. 7f, there are four tools 100, 105, six rows of components 220, 225, 230, 235 on the component track 215, eight partial paths 305, 310, 315 and six machining locations 200, 205, 210. In this variant, the tools 100, 105 share columns instead of rows/partial paths. This is achieved by changing the orientation of the partial paths 305, 310, 315 so that the partial paths 305, 310, 315 are orthogonal to the movement of the partial path 215. The example shown has eight partial paths 305, 310, 315, but the number of partial paths 305, 310, 315 changes depending on the number of columns of components 220, 225, 230, 235. The apparatus 10 for this layout is the same as that of the previous layouts. The number of components 220, 225, 230, 235 machined in a column by each tool 100, 105 can be changed based on the number of components and the number of rows of components relative to the component track 215. This pattern is particularly preferable for variants where the time required for each tool 100, 105 to move between rows of components is less than the time required to place the next column of components 220, 230 under each tool 100, 105.

Figure 7G:
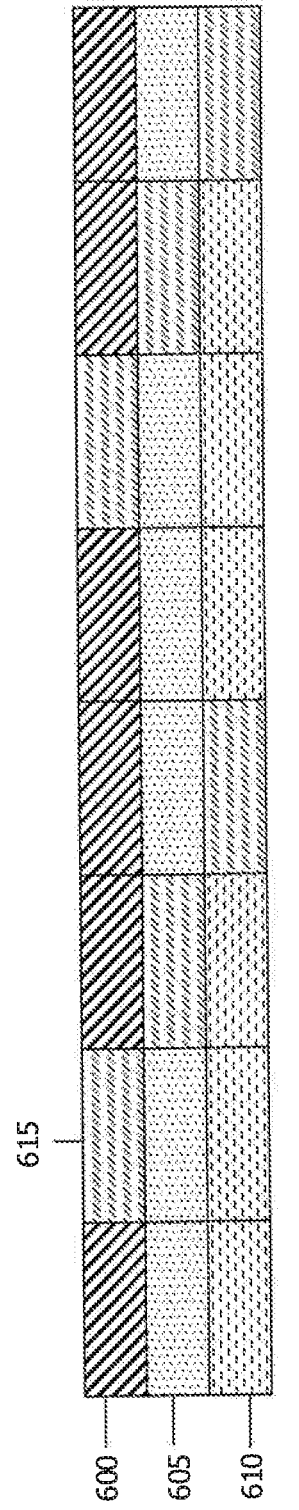

In the variant of FIG. 7g, there are four tools 100, 105, three rows of components 220, 225, 230, 235 on component web 215, three partial paths 305, 310, 315 and three machining locations 200, 205, 210. In this example, there are more tools 100, 105 than partial paths 305, 310, 315 and machining locations 200, 205, 210. The tools 100, 105 associated with patterns 600, 605, 610 machine the majority of each partial path 305, 310, 315. In doing so, these tools periodically omit a machining location 200, 205, 210. This omitted machining location 200, 205, 210 is then machined by the tool 100, 105 to which the fourth pattern 615 is assigned. Depending on the component web 215 and the associated components 220, 225, 230, 235, this may allow for a more efficient apparatus 10. The number of tools 100, 105 and their respective movement patterns 600, 605, 610, 615 may be changed depending on the number of partial paths 305, 310, 315 and machining locations 200, 205, 210.

FIG. 8 shows a table with the total number of tools, machining locations and partial paths according to some variants described herein.

FIG. 8 shows a table with different variants of the apparatus, where t is the total number of tools in the apparatus 10, p is a number of machining locations 200, 205, 210 in each of the processing areas 110, 115, and s is the number of partial paths 305, 310, 315 on track 300. As long as t<p and the numbers of partial paths 305, 310, 315 is equal to the number p of machining locations 200, 205, 210, these values can be changed depending on the component track 215. In some variants t<p≤floor(1.5 t). In some further variants p=1.5 t applies.

Figure 9:
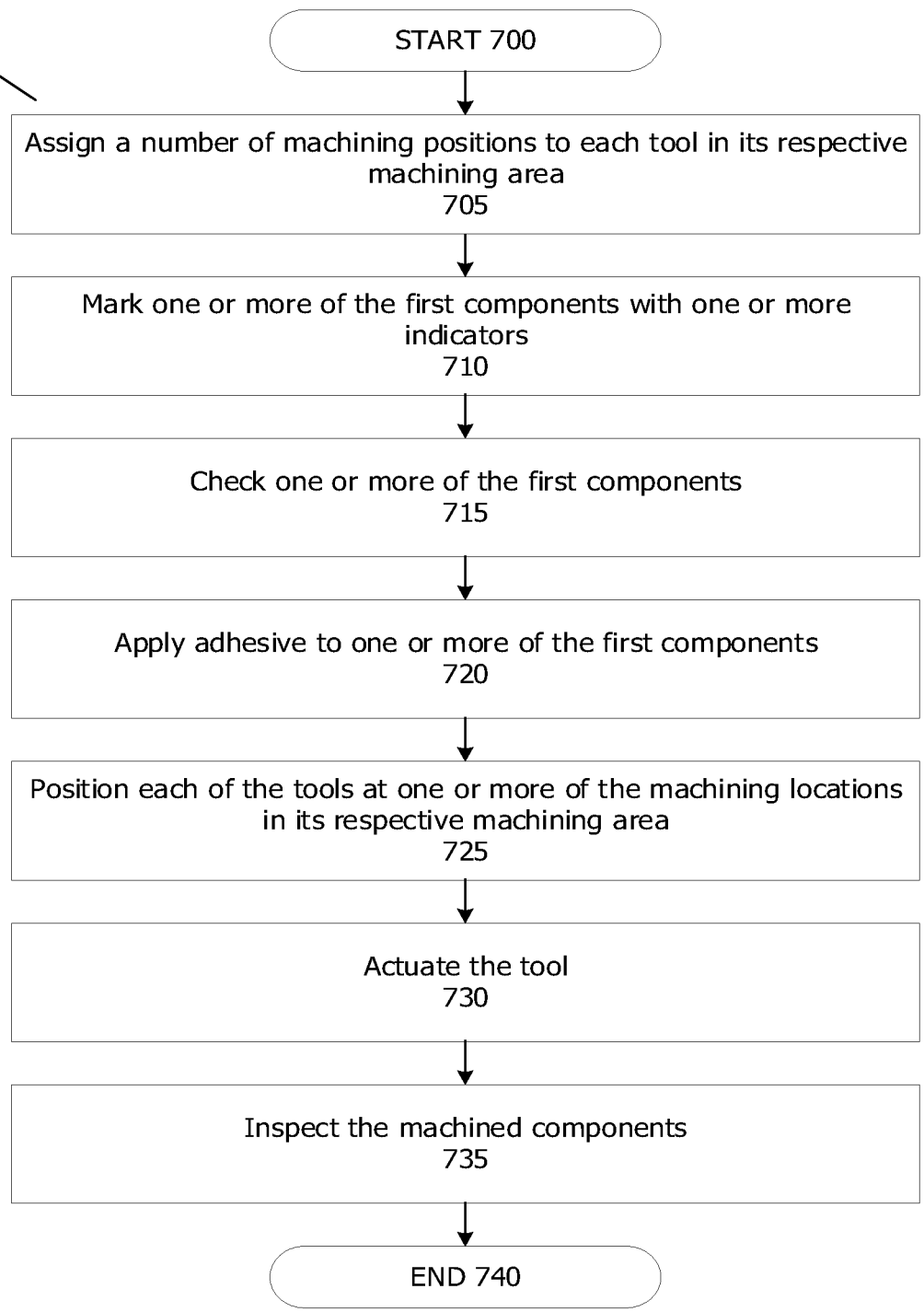
FIG. 9 shows a flow diagram of the process according to a variant described herein.

FIG. 9 shows a flow diagram of the process according to a variant described herein.

In the variant of FIG. 9, each tool 100, 105 is assigned a number p of machining locations 200, 205, 210 in its respective processing area 110, 115—step 705. In some variants, the control unit 400, 405 assigns the machining locations 200, 205, 210 to each tool 100, 105. In some variants, the main control unit 410 assigns the machining locations 200, 205, 210 to each tool 100, 105.

In this variant, one or more of the first components 220, 230 are then marked with one or more indicators—step 710. In some variants, this marking 710 is performed by the marking unit 125. In some variants, the main control unit 410 controls this marking 710 of the first components 220, 230. In some variants, the marking unit 125 marks 710 the first components 220, 230 and sends this related information to the main control unit 410. In some variants, this marking of the first components 220, 230 is controlled by the control units 400, 405 of each tool 100, 105. In some variants, this marking of the first components 220, 230 is independent of the main control unit 410 and the control units 400, 405. In some variants, the second components 225, 235 are marked.

In this variant, one or more of the first components 220, 230 are then inspected by an inspection unit 415, 425—step 715. The inspection unit 415, 425 inspects 715 the components 220, 225, 230, 235 to determine whether or not the components 220, 225, 230, 235 have been processed. The inspection unit 415, 425 then sends this information to its respective control unit 400, 405 and/or main control unit 410. The inspection unit 415, 425 may inspect the components 220, 225, 230, 235 using optical means such as a camera.

In this variant, adhesive is then applied to one or more of the first components 220, 230 via the adhesive application unit 130—step 720. The adhesive application unit 130 may receive instructions from the main control unit 410 or a control unit 400, 405 as to which first components 220, 230 to apply adhesive to. In some variants, the adhesive application unit 130 is independent of the main control unit 410 and the control units 400, 405.

In this variant, each of the tools 100, 105 is positioned by the control unit 400, 405 of said tool 100, 105 at one or more of the machining locations 200, 205, 210 in its respective processing area 110, 115—step 725. The tool 100, 105 is then actuated by the control unit 400, 405—step 730 to machine one or more of the components 220, 225, 230, 235.

In this variant, another of the machined components 220, 225, 230, 235 is inspected by an inspection unit 420, 430—step 735 to verify that the components 220, 225, 230, 235 have been machined correctly. In some variants, the inspection unit 420, 430 checks whether the placement of the second component 225, 235 is correct. In some variants, the inspection unit 420, 430 then sends this respective information to its respective control unit 400, 405. In some variants, the control unit 400, 405 also sends this information to the main control unit 410. In some variants, the main control unit 410 may override the control unit 400, 405 of a subsequent tool 100, 105 and control it so as to process a missing component 220, 225, 230, 235. In some variants, the main control unit 410 may trigger an alarm or send a visual notification to an operator to indicate that a component 220, 225, 230, 235 has been missed by the tool 100, 105. In some variants, triggering an alarm or sending a visual notification occurs when the placement of the second component 225, 235 is unsatisfactory. The inspection unit 420, 430 may receive this information through visual means such as a camera.

In some variants, the transport of the component web 215 is controlled by the main control unit 410. The transport function 120 may convey the component web 215 either continuously or intermittently, depending on the desired movement. In some examples, the transport function 120 is independent of the main control unit 410.

In some variants, epoxy resin is applied to one or more of the machined components 220, 225, 230, 235. In some variants, this application is controlled by the main control unit 410. In some variants, this application is controlled by one or more control units 400, 405. In some variants, the main control unit 410 or the control units 400, 405 sends information to the epoxy resin application unit regarding which processed components need to be coated with epoxy resin. In some variants, the epoxy resin application unit is independent of the main control unit 410 and the control units 400, 405.

The method 20 may include some or all of the above steps. The above steps may be performed in a different order than that shown in FIG. 9; some of the steps may be performed simultaneously.

The invention claimed is:

1. An apparatus for operating at least two tools at a first processing area and a second processing area, wherein
   a number of machining locations are assigned to a respective one of the tools at the first and the second processing areas, wherein first components carried by a component web are conveyed along a component track through the first and the second processing areas, wherein
   the number of tools in the apparatus is less than the number of machining locations at the first and the second processing areas, wherein
   the component track includes a number of partial paths corresponding to the number of machining locations, wherein
   the tool at the first and the second processing areas is adapted to couple respective second components to respective first components at the machining location at the first and the second processing areas, wherein the tool includes a component supply for the second components and a receptacle for the component supply and wherein the apparatus comprises:
   a secondary control unit at the first and the second processing areas that is adapted, in response to a conveying movement of the component web along the component track, to
   position the tool and the receptacle at one or more of the machining locations at the first and the second processing areas, wherein the tool has a needle or a laser, and wherein the positioning includes moving the receptacle in at least one of a x-direction, a y-direction and a rotational direction and
   actuate the tool to mount a first or second component at the respective machining location such that at the first processing area,
   selected first components are conveyed along a first partial path on the component track, and
   selected first components conveyed along a second partial path on the component track are machined by the tool at the first processing area, and at the second processing area,
   selected first components are conveyed along a third partial path on the component track, and
   the first components that are conveyed on the component web along the second partial path, and are not machined at the first processing area, are machined by the tool at the second processing area.

2. The apparatus of claim 1, wherein the second partial path is adjacent to both the first partial path and the third partial path.

3. The apparatus of claim 1, wherein the component web conveyed along the component track through the first and the second processing areas is intermittently or continuously conveyed through a transport function.

4. The apparatus of claim 1, wherein the secondary control units are coupled to a main control unit.

5. The apparatus of claim 1, wherein the total number of tools in the apparatus is t and the number of machining locations at the first and the second processing areas is p, and wherein t<p≤1.5 t.

6. The apparatus of claim 1, wherein the tool at the first processing area moves in response to the tool at the second processing area.

7. The apparatus of claim 1, wherein the secondary control units operate the tools such that the tool at the first processing area machines a first number of first components at the second partial path and the tool at the second processing area subsequently machines a second number of first components at the second partial path, and wherein the first and second number of first components are the same number.

8. The apparatus of claim 1, wherein the secondary control units operate the tools such that the tool at the first processing area machines a first number of first components at the second partial path and the tool at the second processing area subsequently machines a second number of first components at the second partial path, wherein the first and second number of first components are different numbers.

9. The apparatus of claim 1, wherein one or more of the first components and/or one or more of the second components are electronic components.

10. The apparatus of claim 9, wherein at least one of the first electronic components and/or second electronic components is an antenna and at least one of the first electronic components and/or second electronic components is a chip compatible with the antenna.

11. The apparatus of claim 1, wherein the number of partial paths is an integer of the number of machining locations.

12. The apparatus of claim 1, wherein the secondary control units receive information about whether the first component conveyed on the component web along the second partial path has been machined.

13. The apparatus of claim 12, wherein the secondary control units obtain the information by optical means.

14. The apparatus of claim 3, wherein the number of machining locations assigned to the tool at the first and the second processing areas depends on the time required for the tool to move between the machining locations and on the conveyance of the component web through the first and the second processing areas.

15. A method of operating at least two tools at a first and a second processing area, comprising the step of:
allocating a respective tool at the first and the second processing areas for a number of machining locations, wherein first components carried by a component web are conveyed along a component track through the first and the second processing areas, wherein
the number of tools is less than the number of machining locations at the first and the second processing areas, wherein
the component track includes a number of partial paths corresponding to the number of machining locations, and the steps of:
configuring the tool to mount respective second components to respective first components at the machining location at the first and the second processing areas, wherein the tool includes a component supply for the second components and a receptacle for the component supply;
configuring a control unit to move in response to a conveying movement of the component web along the component track,
position the tool at one or more of the machining locations at the first and the second processing areas, wherein the tool has a needle or a laser, and wherein the receptacle is positioned in at least one of a x-direction, a y-direction and a rotational direction and
actuate the tool for mounting a first or second component at the respective machining location so that at the first processing area, selected first components conveyed along a first partial path on the component track, and selected first components conveyed on the component web along a second partial path are machined by the tool at the first processing area, and
in the second area,
selected first components are conveyed on the component web along a third partial path, and
the first components that are conveyed along the component web and are not machined at the first processing area, are machined by the tool at the second processing area.

16. The method of claim 15, wherein the second partial path is adjacent to both the first partial path and the third partial path.

17. An apparatus for operating at least two tools at a first and a second processing area, wherein
a number of machining locations are assigned to a respective tool at the first and the second processing areas, wherein first components carried by a component web are conveyed along a component track through the first and the second processing areas, wherein
the number of tools in the apparatus is greater than the number of machining locations at the first and the second processing areas, wherein the component track includes a number of partial paths corresponding to the number of machining locations, wherein
the tool at the first and the second processing areas is adapted to attach respective second components to respective first components at each associated machining location at the first and the second processing areas, wherein the tool includes a component supply for the second components and a receptacle for the component supply, and wherein the apparatus comprises:
a control unit adapted, in response to a conveying movement of the component web along the track, to
position the tool and the associated receptacle at one or more of the machining locations at the first and the second processing areas, wherein the tool has a needle or a laser, and wherein the positioning includes moving the receptacle in at least one of a x-direction, a y-direction and a rotational direction and
actuate the tool to mount a first or second component at the respective machining location such that
in the first processing area,
selected first components are conveyed along a first partial path on the component track, and
selected first components conveyed along a second partial path on the component track are machined by the tool at the first processing area, and
in the second processing area,
selected first components are conveyed along a third partial path on the component track, and
the first components that are conveyed on the component web along the second partial path, and are not machined at the first processing area, are machined by the tool at the second processing area.

18. The apparatus of claim 17, wherein the second partial path is adjacent to both the first partial path and the third partial path.

19. The apparatus of claim 17, wherein the first partial path and the third partial path are the same partial path.

20. The apparatus of claim 17, wherein the number of machining locations is an integer of the number of tools.

* * * * *